United States Patent
Ishikawa et al.

(10) Patent No.: US 8,308,601 B2
(45) Date of Patent: Nov. 13, 2012

(54) DIFFERENTIAL GEAR DEVICE

(75) Inventors: Shinichiro Ishikawa, Toyota (JP); Masato Kurosaki, Hino (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 209 days.

(21) Appl. No.: 12/698,237

(22) Filed: Feb. 2, 2010

(65) Prior Publication Data

US 2010/0227727 A1 Sep. 9, 2010

(30) Foreign Application Priority Data

Mar. 6, 2009 (JP) .................................. 2009-053184

(51) Int. Cl.
*F16H 48/20* (2006.01)
(52) U.S. Cl. ........................................... 475/231
(58) Field of Classification Search .................. 475/231, 475/235, 240
See application file for complete search history.

(56) References Cited

U.S. PATENT DOCUMENTS

| | | | | |
|---|---|---|---|---|
| 4,123,951 A * | 11/1978 | Kagata | ............. | 475/240 |
| 6,063,000 A * | 5/2000 | Sugimoto | ............. | 475/231 |
| 6,354,979 B1 * | 3/2002 | Lohr | ............. | 475/240 |
| 6,755,764 B2 * | 6/2004 | Okazaki | ............. | 475/235 |
| 7,390,279 B2 * | 6/2008 | Cradit | ............. | 475/235 |
| 7,749,124 B2 * | 7/2010 | Nakajima | ............. | 475/221 |
| 8,021,260 B2 * | 9/2011 | Homan | ............. | 475/235 |
| 2002/0103053 A1 * | 8/2002 | Thompson | ............. | 475/231 |
| 2002/0155913 A1 * | 10/2002 | Fusegi et al. | ............. | 475/150 |
| 2004/0162179 A1 * | 8/2004 | Krzesicki et al. | ............. | 475/231 |
| 2005/0009662 A1 * | 1/2005 | Sudou | ............. | 475/231 |
| 2007/0037654 A1 * | 2/2007 | DeGowske | ............. | 475/231 |
| 2007/0054771 A1 * | 3/2007 | Fusegi | ............. | 475/231 |
| 2007/0095167 A1 * | 5/2007 | Nakajima | ............. | 74/607 |
| 2007/0287569 A1 * | 12/2007 | Miah | ............. | 475/235 |

FOREIGN PATENT DOCUMENTS

| | | |
|---|---|---|
| JP | 09184561 | 7/1997 |
| JP | 2002364730 | 12/2002 |
| JP | 2008014419 | 1/2008 |
| JP | 2008275042 | 11/2008 |
| JP | 2009168042 A | 7/2009 |

* cited by examiner

*Primary Examiner* — Troy Chambers
*Assistant Examiner* — Jude Agendia
(74) *Attorney, Agent, or Firm* — Gifford, Krass, Sprinkle, Anderson & Citkowski, P.C.

(57) ABSTRACT

A differential gear device includes a case in which a housing portion is formed, and which rotates around a rotation center line; a first protruding portion that is located at a position away from the rotation center line, and protrudes from an inner surface of the case toward the rotation center line, wherein the first protruding portion tapers in a direction from the inner surface of the case toward the rotation center line; a first gear that is provided around the first protruding portion, and that is rotatable; a second gear that engages with the first gear, and that is connected with a first output shaft; and a third gear that engages with the first gear, and that is connected with a second output shaft.

12 Claims, 4 Drawing Sheets

DIFFERENTIAL GEAR DEVICE

INCORPORATION BY REFERENCE

The disclosure of Japanese Patent Application No. 2009-053184 filed on Mar. 6, 2009 including the specification, drawings and abstract is incorporated herein by reference in its entirety.

BACKGROUND OF THE INVENTION

1. Field of the Invention

The invention relates to a differential gear device, and more specifically, a differential gear device in which braking force is generated.

2. Description of the Related Art

Differential gear devices installed in vehicles have been proposed. For example, Japanese Patent Application Publication No. 2008-275042 (JP-A-2008-275042) describes a differential gear device that includes a differential case. The differential case includes two boss portions; holding portions that hold pinion gears; and open windows used when gears are mounted. The holding portions are formed in the differential case at two positions. In each of the holding portions, the pinion gear is provided. The holding portions are formed in a peripheral wall portion of the differential case. Each holding portion is a recessed portion that is recessed outward in a radial direction. In the differential gear device, a pinion shaft for supporting the pinion gear is not provided. Thus, the number of components is reduced.

Japanese Patent Application Publication No. 2008-14419 (JP-A-2008-14419) describes a differential device that includes a differential mechanism; and a differential control device that controls a differential action of the differential mechanism. The differential mechanism includes a differential case; pinion shafts inserted into through holes formed in the differential case; pinion gears supported by the pinion shafts; and side gears that engage with the pinion gears. The differential control device includes an electromagnetic actuator; a dog clutch; a return spring; and a controller.

Japanese Patent Application Publication No. 2002-364730 (JP-A-2002-364730) describes a differential device that includes a bevel gear differential mechanism. The differential mechanism includes pinion shafts connected to a differential case via intermediate members; pinion gears provided on the pinion shafts; and output-side side gears that engage with the pinion gears. The differential device includes friction clutches disposed between the output-side side gears and the differential case; an actuator that presses the clutches; and a transmission member that transmits the pressing force to the friction clutches. Differential limiting force is generated using the friction clutches and the like.

Japanese Patent Application Publication No. 9-184561 (JP-A-9-184561) describes a differential device that includes a differential case; differential pinion shafts provided in the differential case; and differential pinion gears provided on the differential pinion shafts. The differential pinion shafts are slidably provided in the differential case. In the differential device, lubricating oil is supplied from the outside of the differential device, to sliding portions between the differential case and the differential pinion shafts. This prevents seizing of the differential pinion shafts.

In the differential gear device described in the publication No. 2008-275042, the number of components is reduced. However, the publication No. 2008-275042 does not describe any configuration for limiting differential action.

The differential control device provided in the differential device described in the publication No. 2008-14419 includes the electromagnetic actuator and the like. Therefore, the size of the differential device is increased.

In the differential device described in the publication No. 2002-364730, the differential limiting force is generated using the friction clutches, the actuator, and the transmission member. Accordingly, the above-described friction clutches and the like need to be provided in the differential device. Thus, the size of the device is increased.

The differential device described in the publication No. 9-184561 does not include a configuration for limiting the differential action.

SUMMARY OF THE INVENTION

The invention provides a differential gear device that limits differential action. More specifically, the invention provides a differential gear device with compact size, which limits the differential action using a simple configuration.

An aspect of the invention relates to a differential gear device that includes a case in which a housing portion is formed, and which rotates around a rotation center line; a first protruding portion that is located at a position away from the rotation center line, and protrudes from an inner surface of the case toward the rotation center line, wherein the first protruding portion tapers in a direction from the inner surface of the case toward the rotation center line; a first gear that is provided around the first protruding portion, and that is rotatable; a second gear that engages with the first gear, and that is connected with a first output shaft; and a third gear that engages with the first gear, and that is connected with a second output shaft. The first gear may be provided at a position away from the inner surface of the case. The first gear may include a ring-shaped base portion that is placed around the first protruding portion, and teeth formed on an outer peripheral surface of the base portion; and a thickness of the base portion in a direction perpendicular to a center line of the first protruding portion may be constant from one end of the base portion to the other end of the base portion in a direction of the center line of the first protruding portion. The first protruding portion may have one of a cone shape and a truncated cone shape. The differential gear device may further include a fourth gear that engages with the second gear and the third gear; and a second protruding portion that is provided on an opposite side of the rotation center line from the first protruding portion.

The differential gear device according to the above-described aspect has compact size. Further, in the differential gear device according to the above-described aspect, braking force is generated to limit the differential action using the simple configuration.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

A differential gear device 100 according to an embodiment of the invention will be described with reference to FIG. 1 to FIG. 4. When reference is made to number of components, amounts, and the like in the embodiment described below, the invention is not necessarily limited to the numbers of components, the amounts, and the like, unless otherwise specified. Also, in the embodiment described below, each constituent element is not necessarily indispensable for the invention, unless otherwise specified.

Figure 1:
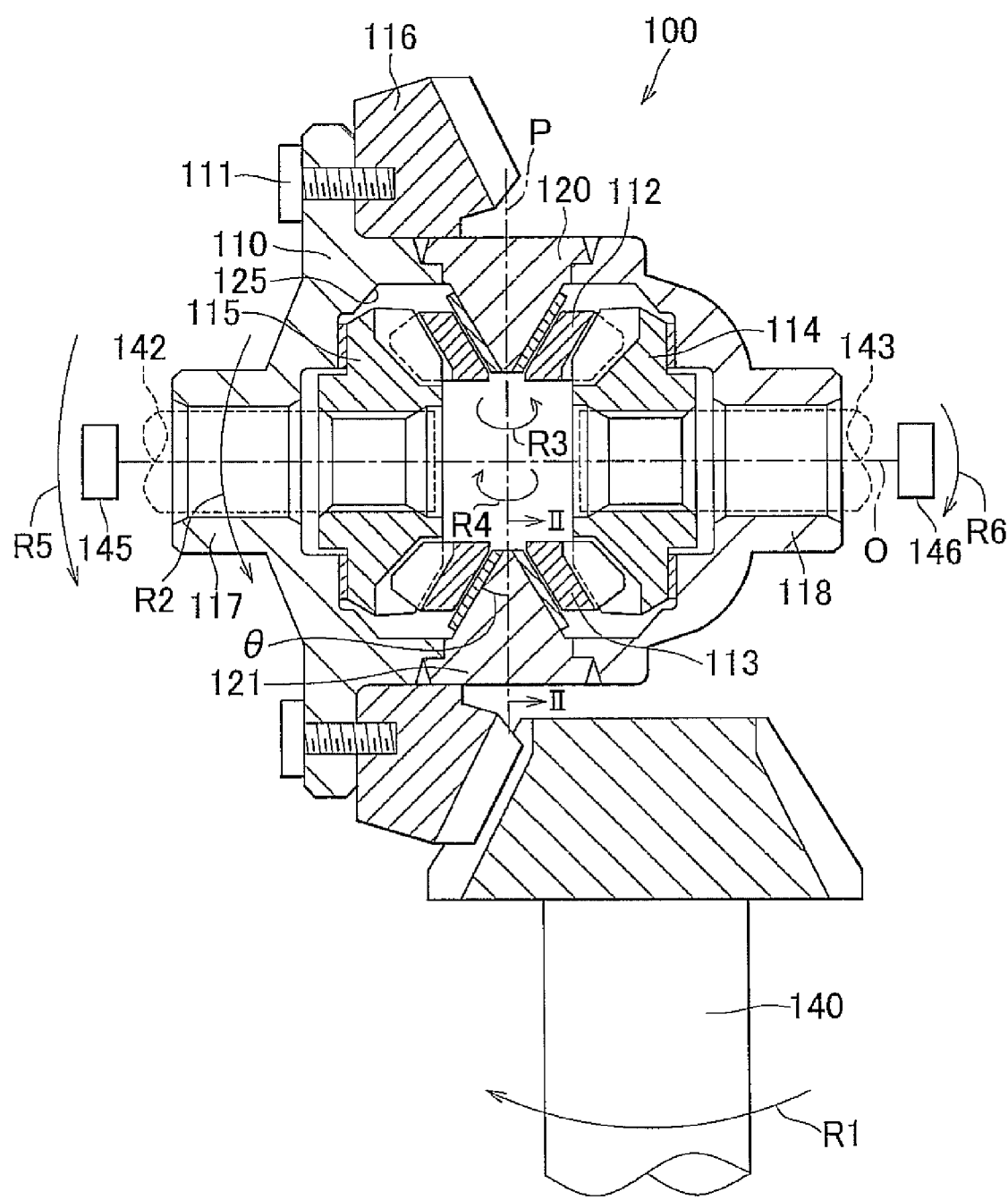
FIG. 1 is a sectional view of a differential gear device according to an embodiment of the invention.

As shown in FIG. 1, the differential gear device 100 includes a differential case 110; protruding portions 120 and 121 provided in the differential case 110; and pinion gears 112 and 113 rotatably provided around the respective protruding portions 120 and 121.

A hollow is formed in the differential case 110, and the hollow in the differential case 110 serves as a housing portion 125. The differential case 110 is installed in a vehicle so that the differential case 110 is rotatable around a rotation center line O. Drive shaft support portions 117 and 118 are formed in the differential case 110. Each of the drive shaft support portions 117 and 118 is cylindrical, and extends in the direction of the rotation center line O.

A circular flange portion is formed on an outer peripheral surface of the differential case 110. A ring gear 116 is fixed to the flange portion by bolts 111. The ring gear 116 engages with a drive pinion gear 140 that is rotated by power from, for example, an engine. A propeller shaft (not shown) is connected to the drive pinion gear 140.

Therefore, when the drive pinion gear 140 rotates in a rotation direction R1, the differential case 110 rotates in a rotation direction R2 around the rotation center line O.

The protruding portions 120 and 121 are located at positions away from the rotation center line O, and protrude from an inner surface of the differential case 110. Accordingly, when the differential case 110 rotates around the rotation center line O, the protruding portions 120 and 121 revolve around the rotation center line O. Each of the protruding portions 120 and 121 tapers in a direction away from the inner surface of the differential case 110. More specifically, each of the protruding portions 120 and 121 tapers in the direction from the inner surface of the differential case 110 toward the rotation center line O. Therefore, a center line of the protruding portions 120 and 121 is orthogonal to the rotation center line O. The protruding portions 120 and 121 are away from each other. The protruding portion 121 is on the opposite side of the rotation center line O from the protruding portion 120, and the protruding portions 120 and 121 face each other.

In the differential gear device 100 according to the embodiment, the pinion gears 112 and 113 are supported using the respective protruding portions 120 and 121. When the differential gear device 100 is compared with a differential gear device in which the pinion gears 112 and 113 are supported by a shaft portion that extends through the housing portion 125, the weight of the protruding portions 120 and 121 is lower than the weight of the shaft portion. That is, in the differential gear device 100 according to the embodiment, the weight of the support member that supports the pinion gears 112 and 113 is reduced.

In the housing portion 125, side gears 114 and 115 are provided. The side gear 114 engages with the pinion gears 112 and 113. The side gear 114 is connected to a drive shaft 143. The side gear 115 engages with the pinion gears 112 and 113. The side gear 115 is connected to a drive shaft 142. The drive shaft 143 is connected to a wheel 146, and the drive shaft 142 is connected to a wheel 145. Both of the drive shafts 142 and 143 extend in the direction of the rotation center line O. The drive shaft 143 is inserted in the drive shaft support portion 118, and the drive shaft 142 is inserted in the drive shaft support portion 117.

When the vehicle travels straight, the proportion of a load applied from a road surface to the wheel 145 is equal to the proportion of a load applied from the road surface to the wheel 146.

The pinion gear 112 revolves around the rotation center line O. However, the pinion gear 112 does not rotate around the protruding portion 120. The pinion gear 113 revolves around the rotation center line O. However, the pinion gear 113 does not rotate around the protruding portion 121.

Accordingly, the side gears 114 and 115 rotate at the same number of revolutions. The drive shaft 143, which is connected to the side gear 114, rotates the wheel 146. The drive shaft 142, which is connected to the side gear 115, rotates the wheel 145.

Hereinafter, the operation of each gear when the vehicle is turning while the wheel 146 is an inner wheel and the wheel 145 is an outer wheel will be described.

When the wheel 146 is the inner wheel, the wheel 146 needs to turn more sharply than the wheel 145, and the load applied from the road surface to the wheel 146 is larger than the load applied from the road surface to the wheel 145. This makes it difficult for the side gear 114 to rotate.

Further, the wheel 145 moves a distance longer than a distance that the wheel 146 moves. Therefore, the number of revolutions of the wheel 145 in a predetermined time is larger than the number of revolutions of the wheel 146 in the predetermined time, and thus, the number of revolutions of the side gear 115 in the predetermined time is larger than the number of revolutions of the side gear 114 in the predetermined time.

Because the rotational speed of the side gear 115 is higher than the rotational speed of the side gear 114, the pinion gears 112 and 113 start to rotate around the respective protruding portions 120 and 121.

The pinion gear 112 rotates around the protruding portion 120 in a rotational direction R3 in FIG. 1, and the pinion gear 113 rotates around the protruding portion 121 in a rotational direction R4 in FIG. 1.

Because the pinion gears 112 and 113 rotate in the above-described manner, the pinion gears 112 and 113 transmit the load of the side gear 114 to the side gear 115.

Thus, because the pinion gears 112 and 113 rotate around the respective protruding portions 120 and 121, the wheel 146 rotates slowly, and the wheel 145 rotates fast. As a result, the vehicle smoothly turns.

The differential case 110 is rotated by drive power from the drive pinion gear 140. The pinion gears 112 and 113 provided in the differential case 110 also revolve around the rotation center line O. Accordingly, centrifugal force is applied to the pinion gears 112 and 113.

As described above, each of the protruding portions 120 and 121, around which the respective pinion gears 112 and 113 are placed, tapers in the direction toward the rotation center line O. Due to the centrifugal force applied to the pinion gears 112 and 113, the pinion gears 112 and 113 move toward large-diameter portions of the respective protruding portions 120 and 121. This increases frictional force between the pinion gears 112 and 113 and the respective protruding portions 120 and 121.

Hereinafter, frictional force applied to pinion gears of a differential gear device in a comparative example described below will be compared with the frictional force applied to the pinion gears 112 and 113 of the differential gear device in the embodiment.

In the differential gear device in the comparative example, two columnar pins are provided in the inner peripheral surface of the housing portion 125, instead of the protruding portions 120 and 121. Pinion gears are placed around the respective columnar pins.

In the differential gear device in the comparative example, centrifugal force is applied to the pinion gears, and the pinion gears contact the inner surface of the differential case 110. As a result, the frictional force is applied to the pinion gears from the inner surface of the differential case 110.

In the differential gear device in the comparative example, a contact area between the pinion gears and the differential case is represented by D, and frictional force FB generated between the pinion gears and the inner surface of the differential case is represented by the following equation (1).

$$FB = \mu \times F \tag{1}$$

In the differential gear device 100 in the embodiment, an angle of a tip portion of each of the protruding portions 120 and 121 is represented by 2θ (θ represents an angle between the rotation center line P around which the pinion gears 112 and 113 rotate, and an outer peripheral surface of each of the protruding portions 120 and 121). The centrifugal force applied to the pinion gears 112 and 113 is represented by F. A contact area between the pinion gears 112 and 113 and the respective protruding portions 120 and 121 is represented by C. Frictional force FA generated between the pinion gears 112 and 113 and the respective protruding portions 120 and 121 is represented by the following equation (2).

$$FA = (\mu \times F)/\sin \theta \tag{2}$$

Because sin θ is equal to or smaller than 1, the frictional force generated between the pinion gears 112 and 113 and the differential case 110 in the differential gear device 100 in the embodiment is larger than the frictional force generated between the pinion gears and the inner surface of the differential case in the differential gear device in the comparative example. This effect is a wedge effect.

When the vehicle travels straight, the pinion gears 112 and 113 do not rotate around the respective protruding portions 120 and 121 as described above. When the vehicle turns, the pinion gears 112 and 113 rotate around the respective protruding portions 120 and 121.

Therefore, because the pinion gears 112 and 113 do not rotate around the respective protruding portions 120 and 121 when the vehicle travels straight, the frictional force generated between the pinion gears 112 and 113 and the respective protruding portions 120 and 121 does not influence the rotation of the wheels 145 and 146. When the vehicle turns, the frictional force (i.e., braking force) is applied to the pinion gears 112 and 113.

For example, if the wheel 145 is idling due to slip or the like when the vehicle is turning, the load applied from the road surface to the wheel 145 is extremely small as compared to the load applied from the road surface to the wheel 146. Thus, the side gear 115 rotates more easily than the side gear 114.

Accordingly, the pinion gears 112 and 113 rotate on the side gear 114 to which large rotational resistance is applied, and revolve around the rotation center line O. The pinion gear 112 rotates in the rotational direction R3, and the pinion gear 113 rotates in the rotational direction R4.

Because the large frictional force is generated between the pinion gears 112 and 113 and the respective protruding portions 120 and 121, differential limiting force generated due to the friction is applied from the pinion gears 112 and 113 to the side gears 114 and 115. Accordingly, it is possible to reduce torque applied to the wheel 145 that is idling, and to apply torque to the wheel 146 that is not idling.

Therefore, even if one wheel slips on a slippery road surface, it is possible to transmit drive power to the other wheel that is not slipping. Thus, it is possible to improve stability of the vehicle when the vehicle is traveling.

Particularly when the vehicle turns at a high speed, the differential case 110 also rotates at a high speed, and the centrifugal force applied to the pinion gears 112 and 113 also increases. Accordingly, the frictional force generated between the protruding portions 120 and 121 and the respective pinion gears 112 and 113 increases. Therefore, if one wheel is idling when the vehicle is turning at a high speed, it is possible to transmit large drive power to the other wheel that is not idling. Thus, it is possible to ensure that the vehicle stably travels.

Further, in the differential gear device 100 in the embodiment, it is possible to generate large braking force, and to limit the differential action, using the above-described simple configuration.

Figure 2:
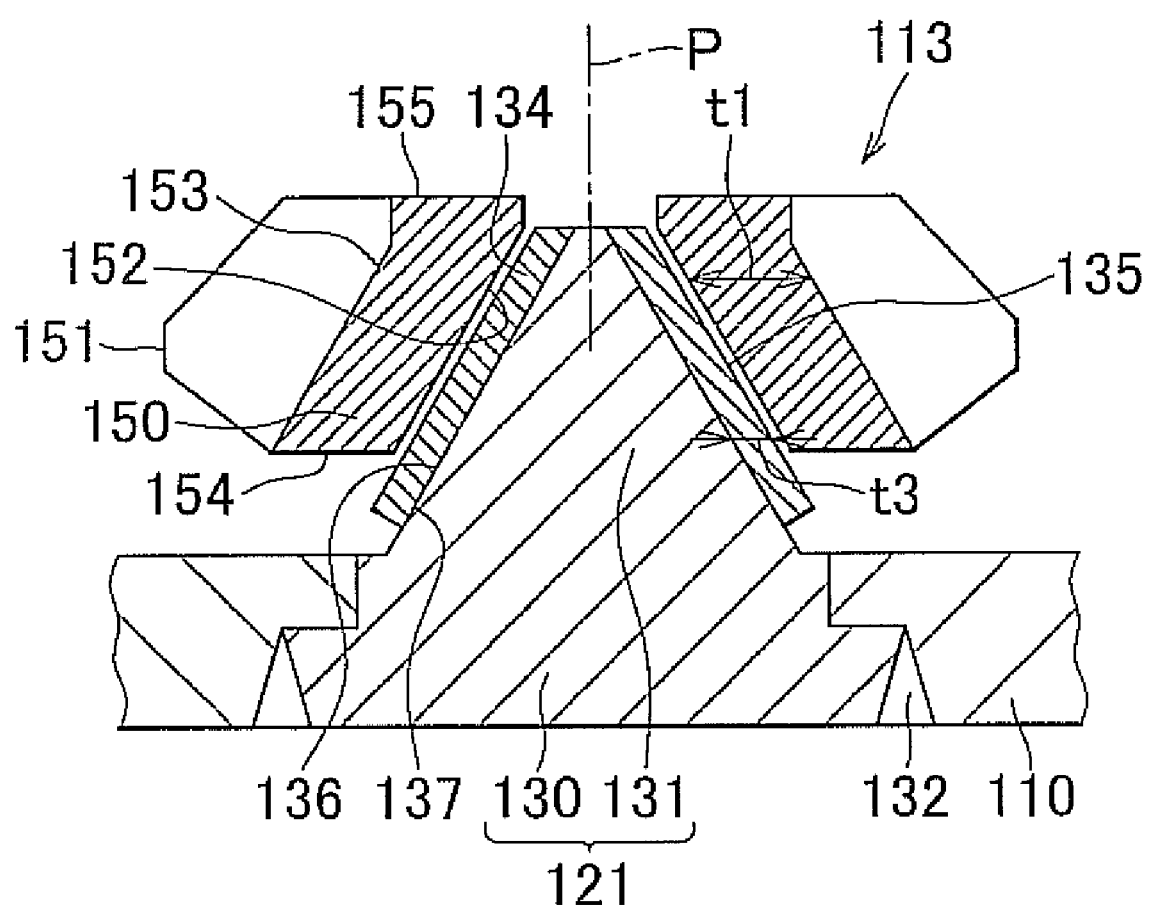
FIG. 2 is a sectional view taken along the line II-II in FIG. 1.

In FIG. 2 and the above-described FIG. 1, the protruding portion 121 includes a fitting portion 130 fitted into a through hole formed in the differential case 110, and a tapered protruding portion 131 that protrudes from a surface of the fitting portion 130. The tapered protruding portion 131 protrudes from the inner surface of the differential case 110.

The fitting portion 130 is fixed to the differential case 110 by solder 132. The tapered protruding portion 131 has a cone shape or a truncated cone shape. An outer peripheral surface 136 of the tapered protruding portion 131 has a taper shape in a sectional view of the tapered protruding portion 131 taken along a hypothetical plane perpendicular to the rotation center line O.

A washer 134, which is hollow, is fitted to the outer peripheral surface 136 of the tapered protruding portion 131. An outer peripheral surface 135 of the washer 134 has the same shape as that of a tapered surface of a truncated cone. An inner peripheral surface 137 of the washer 134 extends along the tapered protruding portion 131. The inner peripheral surface 137 has the same shape as that of the tapered surface of the truncated cone.

A thickness t3 of the washer 134 in a direction perpendicular to the rotation center line P (i.e., the center line of the tapered protruding portion 131) is constant from one end of the washer 134, which is located close to the inner surface of the differential case 110, to the other end of the washer 134, which is located distant from the inner surface of the differential case 110.

Therefore, the outer peripheral surface 135 has the same shape as that of the tapered surface of the truncated cone, and the outer peripheral surface 135 extends along the inner peripheral surface 137 of the washer 134 and the outer peripheral surface 136 of the tapered protruding portion 131.

The pinion gear 113 is placed around the washer 134, and the pinion gear 113 is rotatably provided around the tapered protruding portion 131 with the washer 134 being provided between the pinion gear 113 and the tapered protruding portion 131.

The pinion gear 113 includes a base portion 150, and a plurality of teeth 151. The base portion 150 has a ring shape, and includes a through hole. The teeth 151 are formed on an outer peripheral surface 153 of the base portion 150 at intervals in a circumferential direction of the pinion gear 113.

An inner peripheral surface 152 of the base portion 150 also has the same shape as that of the tapered surface of the truncated cone. The inner peripheral surface 152 extends along the outer peripheral surface 135 of the washer 134 and the outer peripheral surface 136 of the tapered protruding portion 131.

Thus, when the pinion gear 113 is placed around the washer 134 and the tapered protruding portion 131, the center line of the pinion gear 113 coincides with the center line of the tapered protruding portion 131. Thus, the pinion gear 113 is rotatable around the rotation center line P.

When the pinion gear 113 revolves around the rotation center line O, the inner peripheral surface 152 of the pinion gear 113 is pressed to the outer peripheral surface 135 of the washer 134. Accordingly, the inner peripheral surface 137 of the washer 134 is pressed to the outer peripheral surface 136 of the tapered protruding portion 131.

Thus, the frictional force is generated between the tapered protruding portion 131 and the washer 134. In addition, the frictional force is generated between the washer 134 and the pinion gear 113.

Because the outer peripheral surface 136 of the tapered protruding portion 131 has the same shape as that of the tapered surface of the cone, or the tapered surface of the truncated cone, and the inner peripheral surface 137 of the washer 134 also has the same shape as that of the tapered surface of the truncated cone, the frictional force generated between the washer 134 and the tapered protruding portion 131 increases due to, for example, the pressing force applied from the pinion gear 113. This effect is the wedge effect. Similarly, because the centrifugal force is applied to the pinion gear 113, the frictional force between the pinion gear 113 and the washer 134 increases. Thus, the above-described braking force is generated.

By providing the washer 134 between the pinion gear 113 and the tapered protruding portion 131, it is possible to reduce wear of the tapered protruding portion 131 and the pinion gear 113. In the differential gear device 100 according to the embodiment, the washer 134 is disposed between the tapered protruding portion 131 and the pinion gear 113. However, the washer 134 is not indispensable. The pinion gear 113 may be placed directly around the tapered protruding portion 131.

The through hole is formed in the pinion gear 113. One end of the through hole, which faces the inner surface of the differential case 110, has a diameter smaller than outer diameters of large-diameter end portions of the tapered protruding portion 131 and the washer 134 (i.e., the largest outer diameters of the tapered protruding portion 131 and the washer 134). Therefore, the pinion gear 113, which is placed around the protruding portion 121, is provided at a position away from the inner surface of the differential case 110 in a manner such that the inner peripheral surface 152 contacts the outer peripheral surface 135 of the washer 134.

More specifically, the pinion gear 113, which rotates around the rotation center line P, has an end surface 154 that faces the differential case 110. The end surface 154 is located away from the inner surface of the differential case 110.

Because the end surface 154 is located away from the inner surface of the differential case 110, it is not necessary to perform machining process on the end surface 154 so that the end surface 154 extends along the inner surface of the differential case 110. This reduces manufacturing cost of the pinion gear 113.

For example, when the pinion gear is placed around the columnar pin, a spherical portion is formed in the pinion gear, and a spherical recessed portion is formed on the inner surface of the differential case at a position around the above-described pin so that the pinion gear rotates around a predetermined rotation center. The pinion gear is placed around the pin, and the spherical portion of the pinion gear is inserted in the spherical recessed portion. Thus, the pinion gear is positioned so that the center line of the pinion gear coincides with the predetermined rotation center. By forming the spherical recessed portion in the differential case, and forming the spherical portion in the pinion gear, the cost is increased.

In contrast, in the differential gear device according to the embodiment, it is not necessary to form the spherical portions in the pinion gear 113 and the differential case 110. Thus, it is possible to reduce the manufacturing cost.

Both of the inner peripheral surface 152 and the outer peripheral surface 153 of the base portion 150 extend along the outer peripheral surface 136 of the tapered protruding portion 131. Therefore, the base portion 150 is formed so that a thickness t1 of the base portion 150 in a direction perpendicular to the rotation center line P (i.e., the center line of the tapered protruding portion 131) is substantially constant from the end surface 154 to another end surface 155.

When the pinion gear 113 rotates, friction is caused between the pinion gear 113 and the washer 134, and thus, the temperature of the pinion gear 113 is likely to be high. When the temperature of the base portion 150 is high, the base portion 150 is deformed (expanded) due to heat.

However, because the base portion 150 is formed so that the thickness t1 of the base portion 150 is substantially uniform from the end surface 154 to the end surface 155, it is possible to reduce the possibility that the thickness of the base portion 150 expanded by heat varies depending on the position in the base portion 150.

Although the pinion gear 113 and the protruding portion 121 have been described with reference to FIG. 2, the pinion gear 112 and the protruding portion 120 shown in FIG. 1 are formed in the same manners as the manners in which the pinion gear 113 and the protruding portion 121 are formed.

Figure 3:
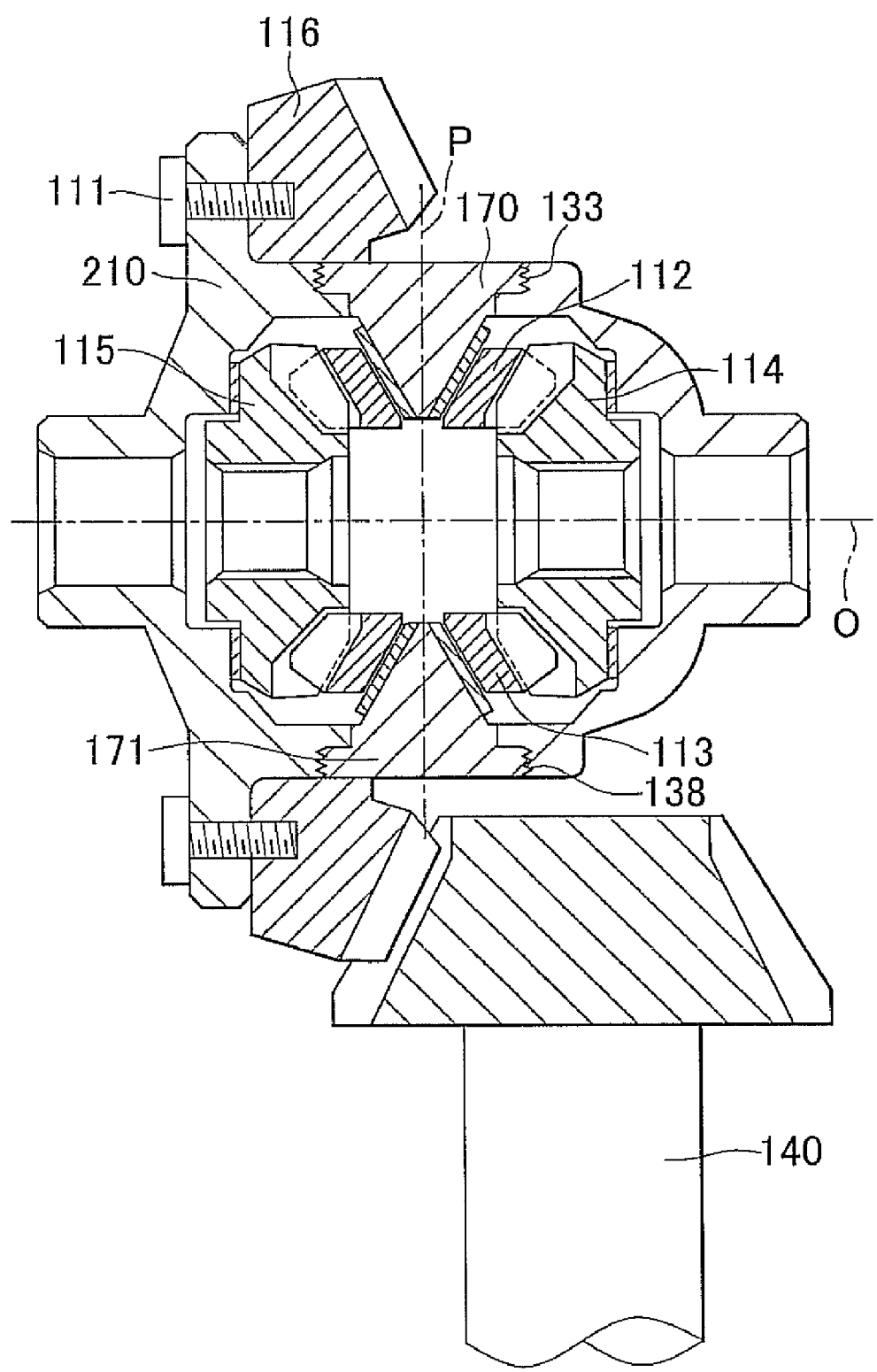
FIG. 3 is a sectional view showing a modified example of the differential gear device according to the embodiment of the invention.

In a modified example shown in FIG. 3, a threaded portion 133 is formed on an outer peripheral edge portion of a fitting portion of a protruding portion 170, and a threaded portion 138 is formed on an outer peripheral edge portion of a fitting portion of a protruding portion 171. Two hole portions are formed in a differential case 210. A threaded portion is formed on an inner peripheral surface of each hole portion. Each of the protruding portions 170 and 171 is screwed into the threaded portion formed in the corresponding hole portion.

In the differential gear device in the modified example, by adjusting the number of times the threaded portions 133 and 138 are turned to fasten the protruding portions 170 and 171, it is possible to adjust the positions of the protruding portions 170 and 171 in the direction of the rotation center line P. Accordingly, it is possible to adjust engagement force between the pinion gear 112 and the side gears 114 and 115, and engagement force between the pinion gear 113 and the side gears 114 and 115.

Figure 4:
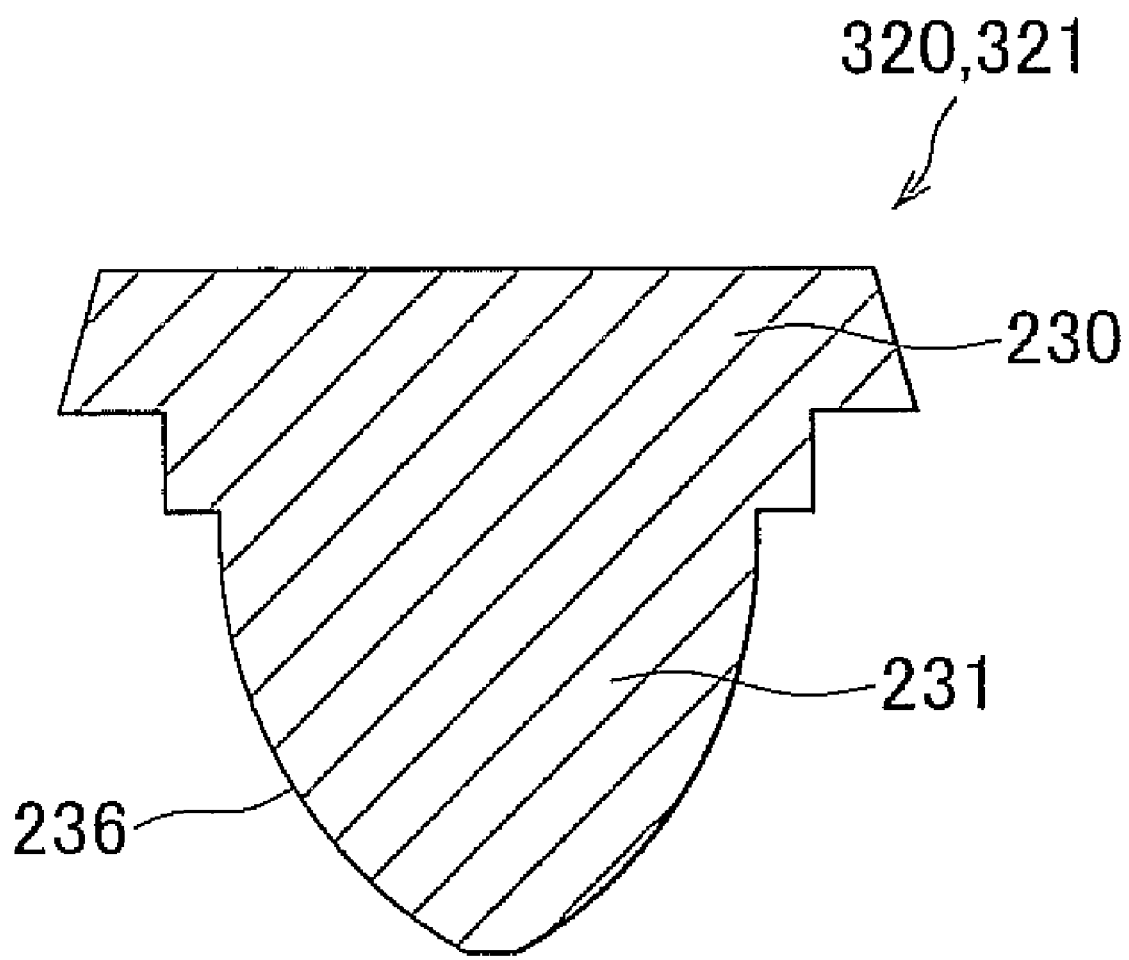
FIG. 4 is a sectional view showing a modified example of a protruding portion according to the embodiment of the invention.

In a modified example shown in FIG. 4, an outer peripheral surface 236 of a tapered protruding portion 231 is curved. The outer peripheral surface 236 has a U-shape in a sectional view of the tapered protruding portion 231 taken along a plane including a center line of the tapered protruding portion 231. In addition, the tapered protruding portion 231 tapers toward a tip portion.

In the modified example in which protruding portions 320 and 321 are thus formed, when the pinion gear 112 is directly placed around the tapered protruding portion 231, the inner peripheral surface of the pinion gear 113 is likely to be in line contact with the outer peripheral surface 236 of the tapered protruding portion 231. Therefore, it is possible to reduce the possibility that a portion of the outer peripheral surface 236 wears.

The differential gear device according to the embodiment may be applied to a rear differential that transmits drive power to right and left rear wheels, a front differential that transmits the drive power to right and left front wheels, and a center differential that reduces a rotational difference between front wheels and rear wheels.

Thus, the embodiment of the invention that has been disclosed in the specification is to be considered in all respects as illustrative and not restrictive. The technical scope of the invention is defined by claims, and all changes which come within the meaning and range of equivalency of the claims are therefore intended to be embraced therein. Further, the above-described numerical values and the like are illustrative, and the invention is not limited to the above-described numerical values and ranges.

What is claimed is:

1. A differential gear device comprising:
a case in which a housing portion is formed, and which rotates around a first rotation center line;
a first protruding portion that is located at a position away from the first rotation center line, and protrudes from an inner surface of the case toward the first rotation center line, wherein the first protruding portion tapers in a direction from the inner surface of the case toward the first rotation center line;
a first gear that is provided around the first protruding portion, and that is rotatable around a second rotation center line;
a second gear that engages with the first gear, and that is connected with a first output shaft; and
a third gear that engages with the first gear, and that is connected with a second output shaft, wherein a position of the first protruding portion is adjustable in a direction of the second rotation center line.

2. The differential gear device according to claim 1, wherein the first gear is provided at a position away from the inner surface of the case.

3. The differential gear device according to claim 1, wherein:
the first gear includes a ring-shaped base portion that is placed around the first protruding portion, and teeth formed on an outer peripheral surface of the base portion; and
a thickness of the base portion in a direction perpendicular to the second rotation center line of the first protruding portion is constant from one end of the base portion to the other end of the base portion in a direction of the second rotation center line of the first protruding portion.

4. The differential gear device according to claim 1, wherein the first protruding portion has one of a cone shape and a truncated cone shape.

5. The differential gear device according to claim 4, wherein the first gear rotates around the first protruding portion.

6. The differential gear device according to claim 1, wherein
an outer peripheral surface of the first protruding portion is circular in a sectional view of the first protruding portion taken along a plane perpendicular to the second rotation center line of the first protruding portion; and
the outer peripheral surface of the first protruding portion has a U-shape in a sectional view of the first protruding portion taken along a plane including the second rotation center line of the first protruding portion.

7. The differential gear device according to claim 1, further comprising:
a fourth gear that engages with the second gear and the third gear; and
a second protruding portion that is provided on an opposite side of the second rotation center line from the first protruding portion.

8. The differential gear device according to claim 7, wherein the second protruding portion has one of a cone shape and a truncated cone shape.

9. The differential gear device according to claim 8, wherein the fourth gear rotates around the second protruding portion.

10. The differential gear device according to claim 8, wherein
the first protruding portion has one of a cone shape and a truncated cone shape; and
the second rotation center line of the first protruding portion coincides with a center line of the second protruding portion.

11. The differential gear device according to claim 1, wherein
the first gear includes a ring-shaped base portion having a through hole; and teeth formed on an outer peripheral surface of the base portion; and
the first protruding portion is inserted in the through hole.

12. The differential gear device according to claim 11, wherein
an inner peripheral surface of the first gear has a same shape as that of a tapered surface of a truncated cone; and
a diameter of one end of the through hole is larger than a diameter of the other end of the through hole, and the diameter of the one end of the through hole is smaller than a largest outer diameter of the first protruding portion.

* * * * *